April 24, 1956     C. H. STOREY, JR., ET AL     2,743,404
MAGNETIC AMPLIFIER FOR A GENERATOR FED MOTOR SYSTEM
Filed March 1, 1952
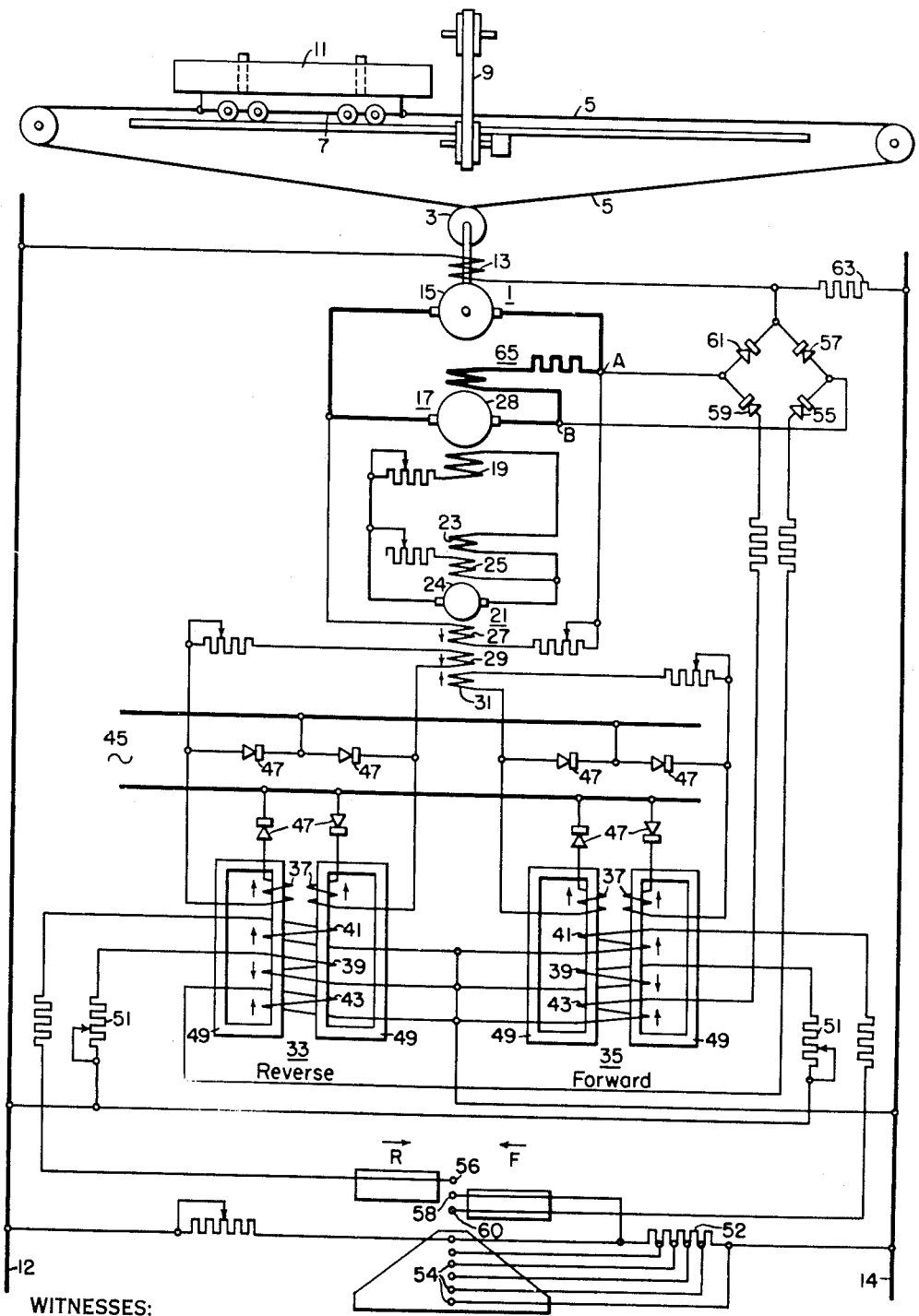
WITNESSES:
Robert C. Baird
Urban H. Faubion
INVENTORS
Walter Schoelchlin &
Charlton H. Storey, Jr.
BY
Paul E. Friedemann
ATTORNEY United States Patent Office 2,743,404
Patented Apr. 24, 1956

2,743,404

MAGNETIC AMPLIFIER FOR A GENERATOR FED MOTOR SYSTEM

Charlton H. Storey, Jr., and Walter Schaelchlin, Buffalo, N. Y., assignors to Westinghouse Electric Corporation, East Pittsburgh, Pa., a corporation of Pennsylvania Application March 1, 1952, Serial No. 274,477

8 Claims. (Cl. 318—143)

This invention relates generally to variable voltage drives. More particularly, the invention relates to electric drive systems for high inertia loads. As applied in the present instance, the invention is shown in a control for an electric drive system for accomplishing a rapid acceleration, deceleration, and reversing of high inertia loads.

A major difficulty with electrical drive systems, and particularly electrical drive systems with high inertia loads, has been that the drive motor armature has been subjected to extremely high overcurrents on acceleration, deceleration, and reversing. Difficulty has also been experienced in obtaining a system which has been as responsive, or "alive," to the operators' control as some mechanical drives such as steam powered systems.

It is a general object of this invention to avoid and overcome the foregoing and other difficulties.

A further object of this invention is to provide a control for an electric drive system having means to control the energization of the driving motor armature in accordance with the voltage across the driving motor armature, the driving motor armature current in excess of a predetermined value, and the position of a controller means.

Still another object of this invention is to provide a control for an electric reversing drive system with high inertia loads, the control providing driving motor current limit for motor acceleration for either direction of rotation and for any regenerative current peaks.

A specific object of this invention is to provide a device of the character referred to wherein the impedance of saturable core impedance devices controls the energization of the driving motor, the impedance of the saturable core impedance devices being determined by the difference between a voltage which is a function of the driving motor armature current and voltage and a reference voltage.

The aforesaid objects of the invention and other objects, which will become apparent as the description proceeds, are achieved by utilizing the motor of a Ward-Leonard system to drive the load, the generator having a relatively short time constant in comparison with the mechanical inertia of the load. The speed of the motor is determined by the excitation of the generator field windings. The generator field windings are supplied from the output of a self-exciting rotating amplifier or amplifying generator having field control windings. The output of the rotating amplifier is determined by the resultant amplifier field which is dependent on the main generator voltage, the self-exciting field windings and the output of two magnetic amplifiers. The output of the magnetic amplifiers is controlled by the saturation of their cores. Control windings are provided for the magnetic amplifiers and the energization of these windings determines the degree of saturation of the magnetic cores and thus determines the output of the magnetic amplifiers. The one set of control windings receives intelligence from a voltage reference source and the other set of windings is disposed to receive a correction signal only when the motor loop current is in excess of a predetermined value due to acceleration, deceleration or over travel of the load.

For a better understanding of the invention, reference should be made to the accompanying drawing.

The single figure shows a schematic diagram of the circuit chosen to illustrate the invention.

Although the principles of the invention are applicable to electric drive systems generally, the invention is particularly applicable to high-inertia drive systems with reversing, such as the log carriage drive system used herein to illustrate the invention.

The "aliveness" of the log carriage drive system to which this invention is applied is dependent upon application of the control with a generator having a relatively short time constant in comparison with the mechanical inertia of the log carriage. The control can then quickly force a sufficient change in generator voltage to cause the current of the motor to reach the limit point. The action of the saturable reactors used then becomes regulating in nature, causing the current to be held up to but not to exceed the predetermined limit value until the speed change has been completed. The regulating action of the saturable reactors therefore assures that speed changes are safely made in the briefest possible period consistent with the capabilities of the drive equipment. The "aliveness" of the drive then is dependent on the response time of the generator and reactors which are especially designed to incorporate short time delay characteristics.

With specific reference to the form of the invention illustrated, a motor 1 is shown driving a log carriage by means of a cable drum 3 and cable 5, the purpose being to drive the log carriage 7 back and forth under the saw 9 to reduce the log 11 to lumber. In this case, a low speed direct current motor, which produces an exceptionally high torque, is used to drive the cable drum directly without use of reduction gears. The field winding 13 of the motor 1 is energized by a constant voltage direct current source connected to leads 12 and 14. The armature 15 of the motor 1 is energized by a direct current generator 17 driven at constant speed, the speed and direction of rotation of the motor armature 15 thus being determined by the polarity of the generator voltage output. Since the generator 17 is driven at constant speed, its voltage will be controlled by the excitation of its separately excited field 19, and thus the speed and direction of rotation of the motor 1 is dependent upon the character of the energization of the generator field 19. A rotating amplifier 21, or amplifying generator, having control field windings 23, 25, 27, 29 and 31, is connected to the generator field winding 19 for the purpose of controlling the energization of the generator field winding, and the rotating amplifier control field windings are for the purpose of controlling the magnitude and sense of the amplifier output. One control field winding 23 is connected in series with the amplifier rotor 24 to provide self-energization. The resistance of the series circuit including the control field 23 is adjusted to fall substantially on the no-load saturation curve of the regulating generator 21. This means that very effective amplification is obtained by the excitation provided by the other control field windings. A second control field winding 25 is provided in shunt with the amplifier armature to reduce hunting. A third control field winding 27 is connected in shunt with the generator armature 28 so that a generator voltage intelligence is introduced into said rotating amplifier field winding 27.

This control field winding 27 thus provides for the rotating amplifier that is responsive to voltage of the main generator 17. Two pilot field control windings 29 and 31, are connected to produce opposite magnetic effects, one winding (29) being for reverse travel of the carriage and the other winding (31) for forward travel. Energization of the reverse pilot field control winding 29 causes the rotating amplifier to establish reverse voltage output by the main generator 17, and energization of the forward pilot field control winding 31 produces forward voltage output, the speed of the carriage being determined by the strength to which these fields are energized.

Two magnetic amplifiers 33 and 35 are provided, each to supply one field control winding. Each magnetic amplifier is provided with main windings 37, biasing windings 39, control windings 41, and current limit control windings 43. It is advisable to supply the main windings 37 of the magnetic amplifiers 33 and 35 from an alternating current source 45 and through rectifiers 47 in full wave bridge arrangement so that the amplifiers 33 and 35 will be self-saturating and will supply the control field windings with a pulsating direct current for each half cycle of the source. The magnitude of the current in the control field windings 29 and 31 is determined by the reactance of the series circuit comprising the rectifiers 47 of the polarity for the particular half cycle chosen, the control field winding and the main winding 37 of the magnetic amplifier. The reactance of the main winding 37 of each magnetic amplifier is determined by the saturation of its magnetic core, the magnetic cores being designated by the numeral 49. The control windings 41, biasing windings 39 and current limit control windings 43 are provided to control the saturation of the core 47 in accordance with their energization. The biasing windings 39 of the magnetic amplifiers 33 and 35 are wound in a sense to produce a magnetic effect which is differential to the effect produced by the main windings 37. Potentiometers 51 are provided in series with the biasing windings 39 across the direct current supply to control the energization of the biasing windings 39 and thereby control the operating characteristics of the magnetic amplifiers 33 and 35.

A drum controller 53 is provided for selectively energizing the control windings 41 of the magnetic amplifiers 33 and 35 and to determine the energization of the selected winding and thus select the magnetic amplifier core to be saturated and control the saturation thereof. This will govern the direction and speed of rotation of the drive motor 1. The energization for the control windings 41 is supplied from the voltage across the resistor 52 so that when the drum controller 53 is in the neutral position as shown all of the contacts 54 are shunted and the controller forward or reversing contacts 60 and 58, and 56 and 58, are open so that there is no voltage across the control winding 41.

When the drum controller 53 is rotated in the forward direction, contacts 60 and 58 are closed, and when the controller 53 is rotated in the reverse direction, the reversing contacts 56 and 58 are closed. For either direction of operation of the drum controller 53, acceleration contacts 54 are successively opened to include resistance in the circuit in steps and thus apply voltage across the control windings 41 in steps. The current limit control windings 43 are each connected in a circuit in series with rectifiers which are provided for the purpose of poling the series circuit. One circuit consists of current limit control winding 43 of the reverse magnetic amplifier 33 in series with rectifiers 55 and 57, the other circuit consists of the current limit control winding 43 of the forward magnetic amplifier 35, and rectifiers 59 and 61. The circuits are connected in parallel with each other across a reference voltage source which consists of the voltage across impedance 63 and form legs of a voltage comparator circuit. A voltage comparative impedance 65 has its opposite ends connected between the two rectifier units 59 and 61, and 55 and 57 in each leg of the voltage comparator circuit, the function of which is to cause a correction current to flow in a current limit control winding 43 when the voltage drop across the voltage comparator impedance 65 is greater than the reference source across impedance 63 and in a sense to cause the current to flow in the poled circuit containing the selected current limit control winding. The purpose of the voltage comparator circuit just described is to limit the current in the driving motor loop (comprised of the driving motor armature 15, the voltage comparator impedance 65 and the main generator armature 28) due to acceleration, deceleration or overtravel of the load to a predetermined value.

Operation

Even though it is believed the operation of the apparatus will be apparent from the foregoing description, a brief summary of a complete cycle will now be given for the purposes of summary and simplification.

If the sawyer desires to drive the log carriage 7 in a forward direction, he will rotate the control drum 53 in the forward direction as indicated on the drawing. This connects the controller contacts 58 and 60 in series and places the control winding 41 of the forward magnetic amplifier 35 across the drum controlled resistor 52. The speed of the log carriage 7 will be determined by the magnitude of the voltage on the control windings 41 which is controlled by the amount of rotation of the drum controller 53. For example, if the drum controller is in neutral position, all of the controller contacts 54 are shorted and, therefore, resistor 52 is shorted and there is no voltage across said resistor. If the controller 53 is rotated to the extreme forward position, all of the drum controller acceleration contacts 54 are open and therefore, there is a maximum voltage across the resistor 52 and consequently across the control winding 41 of the forward magnetic amplifier 35. The control winding 41 energized will increase the saturation of the core 49 of the forward magnetic amplifier 35, thus decreasing the impedance of the main windings 37 to cause the alternating current source 45 to supply an increased current to flow in the series circuits containing the rectifiers 47 in bridge arrangement, the magnetic amplifier main winding 37, and the forward control field winding 31. The increase of energization of the forward control field winding 31 causes the resultant field of the rotating amplifier 21 to be forward. Thus, the output of the rotating amplifier 21 supplied to the main generator 17 will increase. This causes the main generator 17 to have an increased output voltage. This voltage is connected across the driving motor armature 15 and the voltage comparator impedance 65, and thus will cause the motor to pick up speed. Since the motor 1 drives the log carriage 7 directly, the log carriage speed is determined directly by the speed of the motor.

The same sequence of operation obtains for reversed drive of the log carriage except that the control winding 41 of the reverse magnetic amplifier 33 is excited by rotation of the drum controller 53 in the reverse direction. The reverse magnetic amplifier 33 then supplies the reverse control field winding 29 of the rotating amplifier 21, and the generator field winding 19 is excited in the opposite sense by the rotating amplifier 21. Thus, the generator output voltage is applied across the motor armature 15 in the opposite sense, and the motor 1 rotates in the opposite direction.

The current limit control winding 43 only comes into effect when the acceleration or deceleration of the log carriage 7 is too rapid and thus causes an undesirable overcurrent in the motor loop, or when the inertia of the log carriage 7 causes it to travel beyond the desired point, thus causing an undesirable regenerative current peak. For any of the conditions just mentioned, a voltage will appear across the voltage comparator impedance 65 in the motor loop which is great enough to overcome the voltage drop across the reference impedance 63 and cause a correction current to flow in the comparator circuit to correct the condition. For example, if the motor 1 is accelerating the log carriage 7 in the forward direction, and the acceleration current in the motor loop is excessive, the voltage across the voltage comparator impedance 65 will place a voltage across the legs of the voltage comparator circuit between the rectifiers 55 and 57, and 59 and 61 of the respective legs which will be positive at point A with respect to point B. If the voltage is of sufficient magnitude, then a current will flow from the point A, in the leg of the voltage comparator circuits, which contains the control winding for the reverse magnetic amplifier 33, through the properly poled rectifier 61 in that leg through the voltage reference impedance 63, through the current limit control winding 43 in the reverse magnetic amplifier 33, through the rectifier 55 in that leg of the voltage comparator circuit and back to the negative side of the voltage comparator impedance at point B. Thus, the current limit control winding 43 of the reverse magnetic amplifier 33 causes increased saturation in the core 49 of that magnetic amplifier which reduces the impedance of the main windings 37 and allows an increase current to flow in the reverse control field winding 29 of the rotating amplifier which builds up a magnetic field in opposition to that of the forward control field winding 31, thus decreasing the resultant forward field of the rotating amplifier and causing the energization of the generator field 19 to decrease, which decreases the output voltage on the generator 21 and decreases the rate of acceleration of the motor 1. The sequence of operation of control for excess current in the motor loop due to deceleration in the forward direction would cause the polarity of the voltage drop across voltage comparator impedance 65 to be opposite to the one just described, and the current limit control winding 43 of the forward magnetic amplifier 35 would be energized to strengthen the forward pilot control field winding 31 of the rotating amplifier. The current limit control works the same as described whether the overcurrent is due to acceleration or deceleration of the motor in the forward or reverse direction, or to regenerative current peaks except that the current limit control winding which is energized in each case is the proper one for correcting the undesirable condition.

It will be recognized that the objects of the invention have been achieved by providing a control for an electric reversing drive system with a high inertia load which is very much "alive" to the control of the operator, the control system providing a driving motor current limit for either direction of rotation and for any regenerative current peaks.

While in accordance with the patent statutes one best known embodiment of the invention has been illustrated and described in detail, it is to be particularly understood that the invention is not limited thereto but may be applied equally well to other embodiments.

We claim as our invention:

1. In a motor control system, a motor, two amplifier channels, a magnetic amplifier in each channel, a control winding for each magnetic amplifier, controller means for controlling the energization of the control windings, said control windings selectively energized in response to the direction of operation of the controller means and the magnitude of the energizing voltage being determined by the position of the controller means, biasing windings for the magnetic amplifiers disposed upon the magnetic amplifier cores in the same sense and connected to a biasing source, a current limit control winding for each magnetic amplifier, a voltage comparator circuit, each of said current limit control windings in an opposite leg of the voltage comparator circuit, the opposite legs of the voltage comparator circuit being poled in the same sense and having a voltage comparator impedance connected to them in such a way that a current limit control winding receives current only when the voltage drop across the voltage comparator impedance is greater than the standard with which the voltage drop is compared and when the voltage drop is of a polarity to cause current to flow in the poled leg of the voltage comparator circuit, rectifiers connected in full bridge arrangement, main windings for each magnetic amplifier supplied by an alternating current source and connected to said rectifiers, a rotating amplifier having a plurality of control field windings, the main winding and bridge rectifier arrangement of each magnetic amplifier connected respectively to a control field winding for the rotating amplifier, a main generator driven at substantially constant speed and having its field winding energized by the rotating amplifier, and a third control field winding for the rotating amplifier responsive to main generator voltage, the armature of the main generator being in a loop with said motor armature and the fixed comparator impedance.

2. In a motor control system, a driving motor, a main generator, two amplifier channels, a self-saturating magnetic amplifier in each channel, a control winding for each magnetic amplifier, and controller means for controlling the energization of the control windings, said control windings selectively energized in response to the direction of operation of the controller means and the magnitude of the energizing voltage being determined by the position of the controller means, biasing windings for the magnetic amplifiers disposed upon the magnetic amplifier cores in the same sense and connected to a biasing source, a current limit control winding for each magnetic amplifier, a voltage comparator circuit and a voltage comparator impedance, each of said current limit control windings in an opposite leg of the voltage comparator circuit, the opposite legs of the voltage comparator circuit being so poled that the control windings will selectively receive a current limit signal from the voltage comparator impedance when the voltage drop across said impedance is in a sense selected to be controlled by the current limit control winding and of a magnitude greater than a selected standard, a rotating amplifier having a plurality of control field windings, rectifiers connected in full bridge arrangement, main windings for each magnetic amplifier supplied by an alternating current source and connected to said rectifiers, the main windings of each magnetic amplifier connected respectively to supply a control field winding for the rotating amplifier, the control field windings disposed to produce opposite effect on the rotating amplifier, the current for the control field windings being determined by the energization of the main and control windings of the magnetic amplifier, said rotating amplifier connected to excite the main generator in a magnitude and sense determined by the resultant of the effects of the control field windings and a voltage control field winding which is responsive to the main generator voltage, the main generator armature connected in a loop with the armature of the driving motor and the voltage comparator impedance.

3. In a motor control system, a motor, two amplifier channels, a self-saturating magnetic amplifier in each channel, a control winding for each magnetic amplifier, controller means for controlling the energization of the control windings, said control windings selectively energized in response to the direction of operation of the controller means from a reference position and the magnitude of the energization voltage being determined by the position of the controller means, biasing windings for the magnetic amplifiers disposed upon the magnetic amplifier cores in the same sense and connected to a biasing source, a current limit control winding for each magnetic amplifier, a voltage comparator circuit, each of said current limit control windings in an opposite leg of the voltage comparator circuit, the voltage comparator comprising, two legs connected in parallel with each other across a reference source and poled in the same sense, two rectifier units in each leg, and a voltage comparator impedance with its opposite ends connected between the two rectifier units in each leg so that a current limit control winding receives current only when the voltage drop across the voltage comparator impedance is greater than the reference source and when the voltage drop is of a polarity to cause current to flow in the selected leg of the voltage comparator circuit, main windings for each magnetic amplifier supplied by an alternating current source and connected to saturating rectifiers, a rotating amplifier having a plurality of control field windings, the main winding and bridge rectifier arrangement of each magnetic amplifier connected respectively to a control field winding for the rotating amplifier, a main generator driven at substantially constant speed and having its field winding energized by the rotating amplifier, and a voltage control field winding for the rotating amplifier responsive to main generator voltage, the armature of the main generator being in a loop with the motor armature and the fixed comparator impedance.

4. In a motor control system, a motor, two amplifier channels, a magnetic amplifier in each channel, a control winding for each magnetic amplifier, controller means for controlling the energization of the control windings, said control windings selectively energized in response to the direction of operation of a controller means and the magnitude of the energizing voltage being determined by the position of the controller means, biasing windings for the magnetic amplifiers disposed upon the magnetic amplifier cores in the same sense and connected to a biasing source, a current limit control winding for each magnetic amplifier, a voltage comparator circuit, each of said current limit control windings in an opposite leg of the voltage comparator circuit, the opposite legs of the voltage comparator circuit being poled in the same sense and having a voltage comparator impedance connected to them in such a way that a current limit control winding receives current only when the voltage drop across the voltage comparator impedance is greater than the standard with which the voltage drop is compared and when the voltage drop is of a polarity to cause current to flow in the poled leg of the voltage comparator circuit, rectifiers connected in full bridge arrangement, main windings for each magnetic amplifier supplied by an alternating current source connected to said rectifiers, a self-energizing type rotating amplifier having a load resistance such that it operates substantially on the straight portion of its no-load saturation curve and control field windings, the main winding and bridge rectifier arrangement of each magnetic amplifier being connected respectively to a control field winding for the rotating amplifier, a main generator driven at substantially constant speed and having its field winding energized by the rotating amplifier, and a third control field winding for the rotating amplifier responsive to main generator voltage, the armature of the main generator being in a loop with said motor armature and the fixed comparator impedance.

5. In a motor control system, a driving motor, a main generator, two amplifier channels, a self-saturating magnetic amplifier in each channel, a control winding for each magnetic amplifier, and controller means for controlling the energization of the control windings, said control windings selectively energized in response to the direction of operation of the controller means and the magnitude of the energizing voltage being determined by the position of the controller means, biasing windings for the magnetic amplifiers disposed upon the magnetic amplifier cores in the same sense and connected to a biasing source, a current limit control winding for each magnetic amplifier, a voltage comparator circuit, and a voltage comparator impedance, each of said current limit control windings in an opposite leg of the voltage comparator circuit, the opposite leg of the voltage comparator circuit being so poled that the control windings will selectively receive a current limit signal from the voltage comparator impedance when the voltage drop across said impedance is in a sense selected to be controlled by the current limit control windings and of a magnitude greater than a selected standard, rectifiers in full bridge arrangement, each magnetic amplifier having a main winding supplied by an alternating current source and connected in series with said rectifiers, a self-energizing type rotating amplifier having a plurality of control field windings and a load resistance such that it operates substantially on the straight portion of its no-load saturation curve, each main winding of the magnetic amplifier being connected respectively to supply a control field winding of the rotating amplifier, the control field windings disposed to produce opposite effect on the rotating amplifier, the current for the control field windings being determined by the main winding energization and the energization of the magnetic amplifier control windings, the rotating amplifier connected to excite the main generator in a magnitude and sense determined by the resultant effect of the control field windings and a voltage control field winding for the rotating amplifier which is responsive to the main generator voltage, the main generator armature connected in a loop with the armature of the driving motor and the voltage comparator impedance.

6. In a motor control system, two amplifier channels, a self-saturating magnetic amplifier in each channel, a control winding for each magnetic amplifier, and controller means for controlling the energization of the control windings, said control windings selectively energized in response to the direction of rotation of the controller means from a reference position and the magnitude of the energization voltage being determined by the position of the controller means, biasing windings for the magnetic amplifiers disposed upon the magnetic amplifier cores in the same sense and connected to a biasing source, a current limit control winding for each magnetic amplifier, a voltage comparator circuit, each of said current-limit control windings in an opposite leg of the voltage comparator circuit, the voltage comparator circuit comprising, two legs connected in parallel with each other across a reference source and poled in the same sense, two rectifier units in each leg, and a voltage comparator impedance with its opposite ends connected between the two rectifier units in each leg so that a current limit control winding receives current only when the voltage drop across the voltage comparator impedance is greater than the reference source and when the voltage drop is of a polarity to cause current to flow in the selected leg of the voltage comparator circuit, main windings for each magnetic amplifier, a self-energizing type rotating amplifier having a plurality of control field windings and a load resistance such that it operates substantially on the straight portion of its no-load saturation curve, the main winding and saturating rectifiers of each magnetic amplifier being connected respectively to control field windings for the rotating amplifier, a main generator driven at substantially constant speed and having its field windings energized by the rotating amplifier, and a control field winding for the rotating amplifier responsive to main generator voltage, a driving motor having its armature in a loop with the armature of the main generator and the comparator impedance.

7. An electric control system for high inertia drives comprising, a main generator having field exciting means, a drive motor having its armature connected in series with the armature of the main generator, and having field windings excited by a constant voltage direct current source, a rotating amplifier having a plurality of control field windings, two amplifier channels, a magnetic amplifier in each channel, a control winding for each magnetic amplifier, a voltage comparator circuit subjected to a voltage of a selected value and a voltage proportional to the motor armature current, said control windings being responsive to the voltage output of said voltage comparator circuit to thus give the magnetic amplifiers an output determined by the motor armature current in excess of a predetermined value, a first control field winding for said rotating amplifier responsive to the load current of the rotating amplifier, a second control field winding for said rotating amplifier responsive to the polarity and voltage magnitude of the voltage of the main generator means, third and fourth control field winding means responsive to the output of said magnetic amplifiers, said rotating amplifier being connected to control the excitation of the main generator.

8. An electric control system for high inertia drives comprising, a main generator having field exciting means, a drive motor having its armature connected in series with the armature of the main generator, and having field windings excited by a constant voltage direct current source, a self-energizing type amplifying generator having a load resistance such that it falls substantially on the straight portion of the no-load saturation curve of the amplifying generator, two amplifying generator control channels and a magnetic amplifier in each channel, a control winding for each magnetic amplifier, a voltage comparator circuit subjected to a selected voltage and a voltage proportional to the motor armature current, said control windings connected in said voltage comparator circuit to give the magnetic amplifier an output determined by the motor armature current in excess of a predetermined value, a first control field winding for said amplifying generator responsive to the voltage of the main generator, a second control field winding for said amplifying generator responsive to the load current of the amplifying generator, and third and fourth control field winding means responsive to the output of said magnetic amplifiers, said amplifying generator being connected to control the excitation of the main generator.

References Cited in the file of this patent

UNITED STATES PATENTS

| 2,482,484 | Hornbarger et al. | Sept. 20, 1949 |
| 2,597,191 | Schaelchlin et al. | Mar. 20, 1952 |
| 2,600,308 | Lund et al. | June 10, 1952 |
| 2,632,139 | Bloodworth | Mar. 17, 1953 |

FOREIGN PATENTS

| 590,986 | Germany | Jan. 15, 1934 |